UNITED STATES PATENT OFFICE.

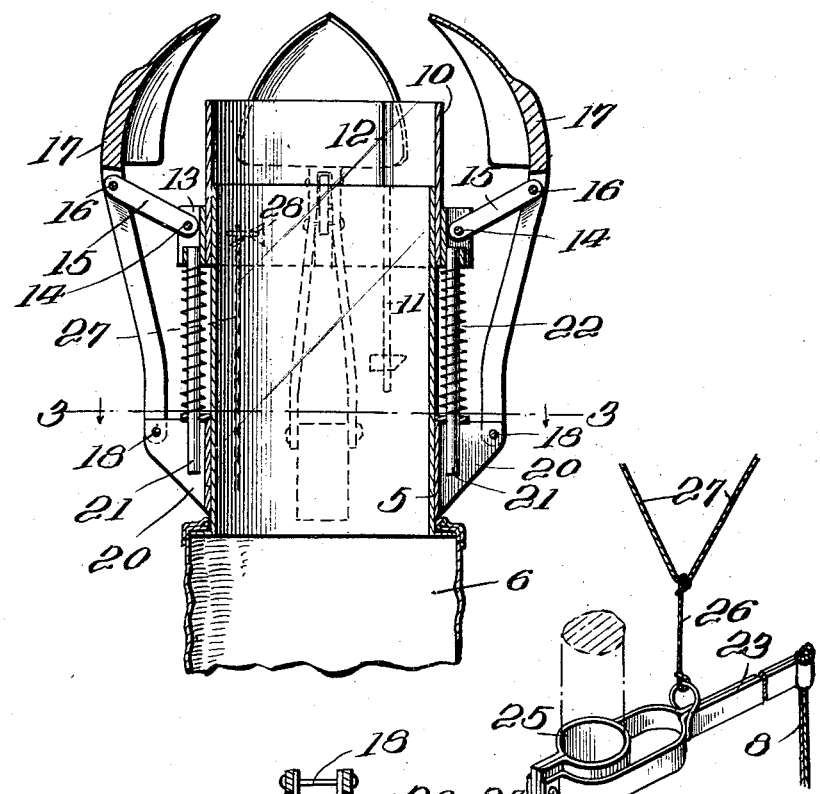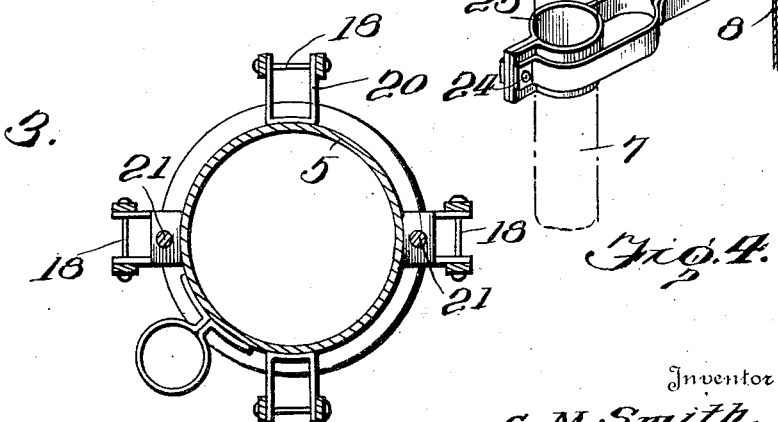

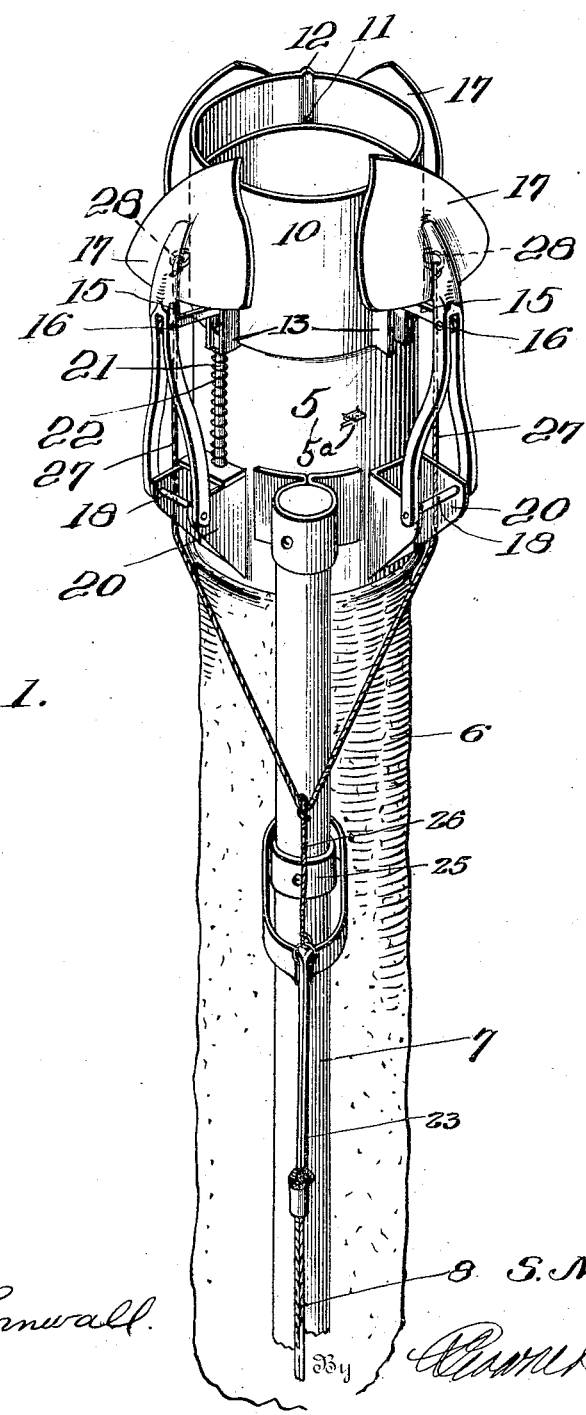

STEPHEN M. SMITH, OF BOISE, IDAHO.

FRUIT-PICKER.

1,246,173. Specification of Letters Patent. Patented Nov. 13, 1917.

Application filed September 16, 1916. Serial No. 120,464.

*To all whom it may concern:*

Be it known that I, STEPHEN M. SMITH, a citizen of the United States, residing at Boise, in the county of Ada and State of Idaho, have invented certain new and useful Improvements in Fruit-Pickers, of which the following is a specification.

This invention relates to fruit pickers, and more particularly to an apparatus or device designed to permit the picking of fruit such as peaches, apples, etc., by a person standing on the ground, and conduct the fruit to a suitable receptacle without injury.

One of the objects of the present invention is to provide a simple and practical fruit picker of the above general character which will be reliable and efficient in use and operation.

Another object is to provide a fruit picker of the above mentioned character having few parts, which will be cheap to manufacture.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, in which—

Figure 1 is a perspective view of the complete device in normal position;

Fig. 2 is a vertical central section of the device in substantially the position shown in Fig. 1;

Fig. 3 is a transverse sectional view taken on the line 3—3, Fig. 2;

Fig. 4 is a detail perspective view.

Referring now to the drawings in detail, and more particularly to Fig. 1, 5 denotes a cylindrical or tubular body member upon which the operative mechanism hereinafter described is mounted. To the lower end of this member is attached a piece of flexible, preferably fabric, tubing 6, of a diameter more or less approximating the maximum diameter of the fruit to be picked. The fruit drops through this tube which acts in the nature of an air cushion, and is thus conducted without serious injury to a basket or box on the ground adjacent the operator. The body member 5 is supported at the upper end of a pole 7 which is held supported by the operator by one hand, while the operating mechanism, which terminates in a cord 8, is actuated by the other hand.

Surrounding the tubular body member 5 is a second tubular member 10 having a telescopic movement with respect thereto and being guided in its movement by means of a rod 11 secured to the body member 5, and sliding in a groove 12 in the telescoping member 10. This telescopic movement is limited by means of the stop 5$^a$. At a plurality of points about the member 10 are pairs of lugs 13 having pivotal pins 14 upon which links 15 are mounted. The upper ends of these links are pivotally connected at the point 16 to the central part of picking jaws 17. The lower ends of these jaws are pivotally mounted at 18 upon lugs 20 rigidly secured to the base of the member 5. Between the lugs 14 and 20 are guide rods 21 about which spiral springs 22 are coiled. These springs normally tend to hold the telescopic members in opened position, as shown in Fig. 1 and one pair acting at diametrically opposite points on the member 10 are usually sufficient, although four may be used, if so desired.

Referring now to Figs. 1 and 4, it will be seen that the actuating cord 8 is connected to the outer end of a lever 23 pivotally mounted at 24 on a clamp 25 surrounding the pole 7. Intermediate the ends of this lever 23 is attached a second cord 26 having branches 27 leading to hooks 28 on approximately opposite sides of the member 10. Thus as the cord 8 is pulled downwardly movement is communicated to cause a downward telescopic movement of the part 10 with respect to the part 5. This movement causes a compression of the springs 22 and an inward movement of the picking jaws 17 which, being of a shape substantially as shown in Fig. 1, completely surround the upper part of the piece of fruit to be picked. A slight pull on the pole, causing a downwardly bodily movement of the complete device, will separate the fruit from the branch and allow it to fall through the tubular member 6.

From the above description it is believed that the construction and method of use will be clear to those familiar with the subject, and a further description thereof is unnecessary. The device is simple and practical in its construction and operation, and is designed to accomplish, among others, all of the objects and advantages herein set forth.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. In a fruit picker in combination, a tubular body member, a flexible conveyer tube connected with the lower part thereof, a member telescoping with said first member, a pole supporting said first member, means on said pole for causing a relative telescopic movement of the two tubular members, and pivotally mounted picker jaws mounted upon one of said telescoping parts and connected with the other whereby they close over the open end of the tubular member on such telescopic movement.

2. In a fruit picker in combination, a tubular conduit member, a second tubular member mounted for telescopic movement with respect thereto, picker jaws pivotally mounted upon one of said members, and connected with the other actuating means mounted upon the latter to cause said picker jaws to close over the upper end of said tubular members, hand operated means to move said actuating means and a guide member associated with said tubular members to prevent relative rotation.

3. In a fruit picker in combination, a tubular conduit member, a second tubular member mounted for telescopic movement with respect thereto, picker jaws pivotally mounted upon one of said members, and connected with the other actuating means mounted upon the latter to cause said picker jaws to close over the upper end of said tubular members, a guide member associated with said tubular members to prevent relative rotation, and spring means acting directly between said two tubular members to restore the telescopic parts and picker jaws to normal position.

4. In a fruit picker in combination, a tubular member, a second tubular member telescopically mounted thereon, picker jaws mounted upon said tubular members to close over the open end of said tubular members as said members moved telescopically, a supporting pole upon which one of the tubular members is mounted, actuating means upon said pole and connected with the other tubular member to cause said telescopic movement, and spring means acting between said telescopic parts to restore the picker jaws to normal position on release of the actuating means, said spring means comprising a plurality of guide rods having spiral springs thereon which may be compressed as the telescopic movement takes place in closing said picker jaws.

In testimony whereof I affix my signature in presence of two witnesses.

STEPHEN M. SMITH.

Witnesses:
P. O. MUMETER,
W. M. WILTON.

Copies of this patent may be obtained for five cents each, by addressing the "Commissioner of Patents, Washington, D. C."